(12) United States Patent
Yen et al.

(10) Patent No.: US 12,132,353 B2
(45) Date of Patent: Oct. 29, 2024

(54) ROTOR, SYNCHRONOUS RELUCTANCE MOTOR, AND ROTOR FORMING METHOD

(71) Applicant: NIDEC CORPORATION, Kyoto (JP)

(72) Inventors: Sheng-Chan Yen, Taipei (TW); Hsin-Nan Lin, Taipei (TW); Ta-Yin Luo, Taipei (TW); Guo-Jhih Yan, Taipei (TW); Yu-Wei Hsu, Taipei (TW); Huu-Tich Ngo, Taipei (TW); Cheng-Tsung Liu, Kaohsiung (TW)

(73) Assignee: NIDEC CORPORATION, Kyoto (JP)

( * ) Notice: Subject to any disclaimer, the term of this patent is extended or adjusted under 35 U.S.C. 154(b) by 693 days.

(21) Appl. No.: 17/266,617

(22) PCT Filed: Aug. 6, 2019

(86) PCT No.: PCT/JP2019/031015
§ 371 (c)(1),
(2) Date: Feb. 8, 2021

(87) PCT Pub. No.: WO2020/032077
PCT Pub. Date: Feb. 13, 2020

(65) Prior Publication Data
US 2021/0296948 A1 Sep. 23, 2021

(30) Foreign Application Priority Data
Aug. 9, 2018 (CN) .......................... 201810902759.7

(51) Int. Cl.
*H02K 1/276* (2022.01)
*H02K 1/24* (2006.01)
(Continued)

(52) U.S. Cl.
CPC ........... *H02K 1/246* (2013.01); *H02K 1/2766* (2013.01); *H02K 15/03* (2013.01); *H02K 19/02* (2013.01)

(58) Field of Classification Search
CPC .. H02K 19/103; H02K 29/03; H02K 2213/03; H02K 21/22; H02K 21/16;
(Continued)

(56) References Cited

U.S. PATENT DOCUMENTS 8,674,575 B2   3/2014 Sakai et al.
8,796,898 B2 * 8/2014 Hashiba ................. H02K 1/223
                                                         310/182
(Continued)

FOREIGN PATENT DOCUMENTS

CN    206962559 U    2/2018
JP    S51127404 A    11/1976
(Continued)

OTHER PUBLICATIONS

International Search Report in PCT/JP2019/031015, mailed Oct. 21, 2019. 4pp.

*Primary Examiner* — Bryan R Perez
(74) *Attorney, Agent, or Firm* — HAUPTMAN HAM, LLP (57) ABSTRACT

A rotor includes a rotor core that is made of electromagnetic steel sheets rotating around a central axis and laminated in an axial direction, and that has multiple flux barriers penetrating the electromagnetic steel sheets along the axial direction. At least some of the multiple flux barriers are provided with a first penetrating portion and a second penetrating portion arranged in the radial direction, the first penetrating portion housing a magnet and the second penetrating portion housing a conductive non-magnetic conductor.

10 Claims, 7 Drawing Sheets

(51) Int. Cl.
*H02K 15/03* (2006.01)
*H02K 19/02* (2006.01)

(58) Field of Classification Search
CPC ...... H02K 21/46; H02K 1/246; H02K 1/2766;
H02K 1/276; H02K 1/02; H02K 1/2773;
H02K 1/24; H02K 1/146; H02K 1/2706;
H02K 1/278; H02K 1/28; H02K 1/16;
H02K 1/165; H02K 1/22; H02K 1/27;
H02K 1/2791; H02K 1/20
See application file for complete search history.

(56) References Cited

U.S. PATENT DOCUMENTS

| | | | |
|---|---|---|---|
| 10,804,758 B2 | 10/2020 | Termini et al. | |
| 2015/0349615 A1 | 12/2015 | Mckinney et al. | |
| 2017/0163111 A1* | 6/2017 | Lan | H02K 17/20 |
| 2017/0310172 A1* | 10/2017 | Büttner | H02K 15/12 |
| 2018/0226848 A1* | 8/2018 | Kolehmainen | H02K 19/14 |
| 2018/0342916 A1* | 11/2018 | Krizan | H02K 21/028 |
| 2019/0238012 A1* | 8/2019 | Dmitrievskii | H02K 21/025 |

FOREIGN PATENT DOCUMENTS

| | | | |
|---|---|---|---|
| JP | 2000116085 A | 4/2000 | |
| JP | 2002354728 A | 12/2002 | |
| JP | 2006121765 A | 5/2006 | |
| JP | 2012178922 A | 9/2012 | |
| JP | 201893603 A | 6/2018 | |

\* cited by examiner

ROTOR, SYNCHRONOUS RELUCTANCE MOTOR, AND ROTOR FORMING METHOD

CROSS-REFERENCE TO RELATED APPLICATIONS

This is the U.S. national stage of application No. PCT/JP2019/031015, filed on Aug. 6, 2019, and priority under 35 U.S.C. § 119 (a) and 35 U.S.C. § 365 (b) is claimed from Chinese Patent Application No. 201810902759.7, filed on Aug. 9, 2018.

This application claims priority under Chinese Application No. 201810902759.7 filed on Aug. 9, 2018 and incorporates all the statements contained in that Chinese application.

FIELD OF THE INVENTION

The present invention relates to the motor field, and particularly to a rotor, a synchronous reluctance motor, and a rotor forming method.

BACKGROUND

In a conventional motor, it is possible to achieve an effect of self-starting by using an aluminum rotor of an induction motor. In the aluminum rotor, a coil direct connection structure is adopted, and when the coil is energized, torque is generated by induction of a current by an aluminum conductor, whereby self-starting is achieved. However, the efficiency of an induction motor is generally low, usually at the IE3 level. Hence, in order to increase the efficiency to IE4 or higher levels, it is necessary to adopt high quality materials when manufacturing the motor to reduce motor loss. This greatly increases the material cost of the motor.

In another technology, it has been proposed to adopt the design of a permanent magnet synchronous motor or a synchronous reluctance motor to bring the efficiency to IE4 or higher levels, and also reduce the material cost by reducing the volume of the motor. However, in such a motor, it is necessary to achieve self-starting by using a drive controller provided with a closed loop. As a result, the structure of the permanent magnet synchronous motor is complicated for the coil direct connection structure.

Based on the above technology, conventionally, a self-starting synchronous reluctance motor made of cast aluminum has been developed. A coil direct connection structure can be used in the motor, and by filling flux barriers with an aluminum conductor, a distance between magnetic fields generated by the flux barriers and the coils through the aluminum conductor can be shortened, and motor efficiency can be improved. Additionally, the efficiency of a self-starting synchronous reluctance motor made of some aluminum castings can reach the IE4 level, and low material cost can be maintained.

It is possible to bring the efficiency of a self-starting synchronous reluctance motor made of some aluminum castings to the IE4 level with a low-cost material. However, higher efficiency (e.g., IE5 level) can only be achieved by using high quality materials and increasing the volume of the motor.

For this reason, in order to improve the efficiency of a synchronous reluctance motor, it has been proposed not only to provide a conductive non-magnetic conductor (e.g., aluminum conductor) in the flux barrier of the motor, but also to insert a magnet in the flux barrier of the motor. For example, it is possible to meet the demand for high efficiency such as the IE5 level. That is, by providing both the conductor and the magnet together in the flux barrier of the synchronous reluctance motor, it is possible to satisfy the demand for high efficiency.

However, if the magnet placed in the flux barrier of a synchronous reluctance motor is completely blocked by two non-communicating parts, the starting characteristics of the motor (i.e., ability to receive external load and external inertia) will be reduced significantly as compared to a synchronous reluctance motor fully injected with an aluminum conductor.

SUMMARY

A rotor of one aspect of the present invention is a rotor including a rotor core that is made of electromagnetic steel sheets rotating around a central axis and laminated in an axial direction, and that has multiple flux barriers penetrating the electromagnetic steel sheets along the axial direction, in which at least some of the multiple flux barriers are provided with a first penetrating portion and a second penetrating portion arranged in the radial direction, the first penetrating portion housing a magnet and the second penetrating portion housing a conductive non-magnetic conductor.

A synchronous reluctance motor of one aspect of the present invention includes the rotor described in the invention of the rotor.

A rotor forming method of one aspect of the present invention is a method of forming a rotor including a rotor core that is made of electromagnetic steel sheets rotating around a central axis and laminated in an axial direction, and that has multiple flux barriers penetrating the electromagnetic steel sheets along the axial direction, at least some of the multiple flux barriers being provided with a first penetrating portion and a second penetrating portion arranged in the radial direction, the method including: inserting a conductive non-magnetic solid conductor into the second penetrating portion; inserting a mold into the first penetrating portion to form a gap from a space other than the solid conductor and the mold in the at least some of the flux barriers; injecting a liquid conductor made of the same material as the solid conductor into the gap until the liquid conductor fills the gap; curing and molding the injected liquid conductor; pulling out the mold; and inserting a magnet into the first penetrating portion.

A rotor forming method of one aspect of the present invention is a method of forming a rotor including a rotor core that is made of electromagnetic steel sheets rotating around a central axis and laminated in an axial direction, and that has multiple flux barriers penetrating the electromagnetic steel sheets along the axial direction, at least some of the multiple flux barriers being provided with a first penetrating portion and a second penetrating portion arranged in the radial direction, the method including: inserting a mold into the first penetrating portion to form a gap including the second penetrating portion from a space other than the mold in the at least some of the flux barriers; injecting a conductive non-magnetic liquid conductor into the gap until the liquid conductor fills the gap; curing and molding the injected liquid conductor; pulling out the mold; and inserting a magnet into the first penetrating portion.

The above and other elements, features, steps, characteristics and advantages of the present disclosure will become more apparent from the following detailed description of the preferred embodiments with reference to the attached drawings.

DETAILED DESCRIPTION

Hereinafter, embodiments of the present invention will be described with reference to the drawings.

Note that the scope of the present invention is not limited to the embodiments described below, but includes any modification thereof within the scope of the technical idea of the present invention.

In examples of the present invention, while terms such as "first" and "second" are used to distinguish different elements by name, the terms do not indicate the spatial arrangement, temporal order, and the like of the elements, and the elements are not limited by these terms. The term "and/or" includes any one of, or some or all combinations of terms given in association with the term "and/or".

In the examples of the present invention, "one", "the", and the like indicating a single mode include multiple modes, and while the term should be broadly understood as "one type" or "one class", the term is not limited to the meaning of "one". Additionally, the term "above" should be understood to include both single and multiple modes, unless otherwise described in earlier or following sentences. Additionally, the term "by" should be understood as "at least partly by . . . " unless otherwise described in earlier or following sentences, and the term "based" should be understood as "at least partly based on . . . " unless otherwise described in earlier or following sentences.

In the following description of the present invention, for convenience, a center line around which a rotating portion of a motor can rotate is referred to as "central axis", a direction that is the same as or parallel to a direction in which the central axis extends is referred to as "axial direction", the radial direction centered on the central axis is referred to as "radial direction", and the circumferential direction centered on the central axis is referred to as "circumferential direction".

Figure 1:
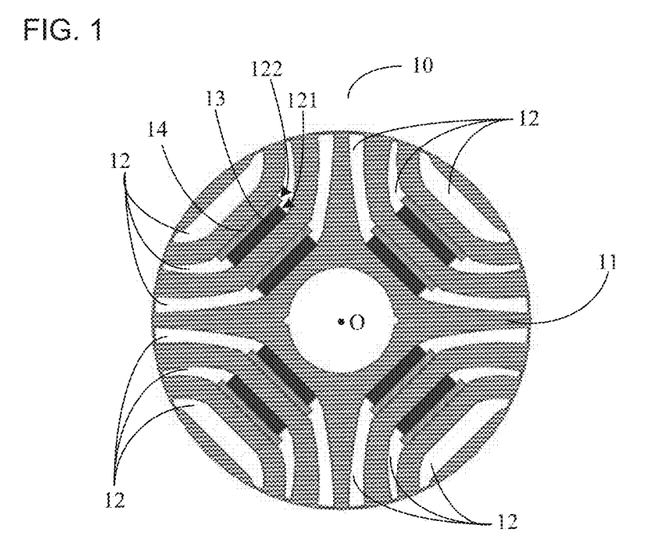
FIG. 1 is a schematic view of a rotor core according to Example 1 of the present invention as viewed from an axial direction.
Figure 2:
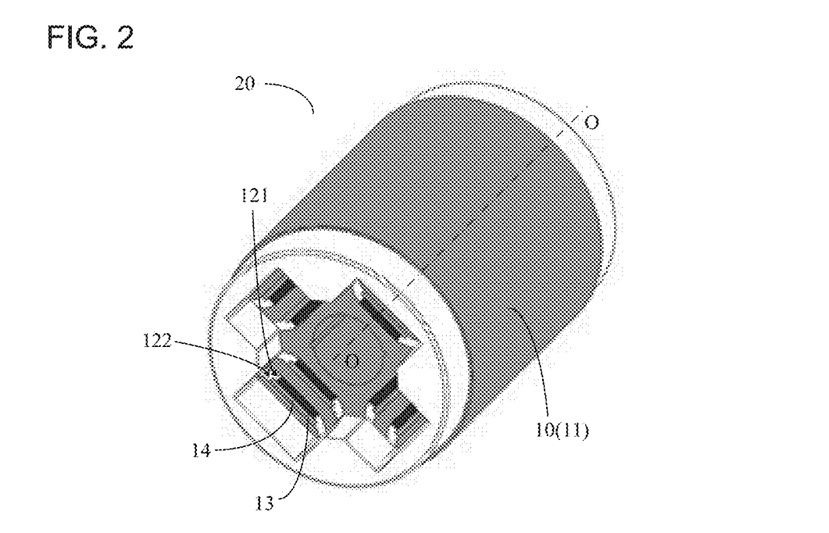
FIG. 2 is a perspective view of the rotor according to Example 1 of the present invention.

Example 1 provides a rotor. FIG. 1 is a schematic view of a rotor core according to Example 1 of the present invention as viewed from the axial direction. FIG. 2 is a perspective view of the rotor according to Example 1 of the present invention.

As shown in FIGS. 1 and 2, a rotor 20 includes a rotor core 10 that is formed of electromagnetic steel sheets 11 rotating around a central axis O-O and laminated in an axial direction, and that has multiple flux barriers 12 penetrating the electromagnetic steel sheets 11 along the axial direction. At least some of the multiple flux barriers 12 are provided with a first penetrating portion 121 and a second penetrating portion 122 arranged in the radial direction. For example, in FIG. 1, the outermost flux barrier in the radial direction is not provided with the first penetrating portion 121 and the second penetrating portion 122, and all of the other flux barriers are provided with the first penetrating portion 121 and the second penetrating portion 122. The first penetrating portion 121 houses a magnet 13 and the second penetrating portion 122 houses a conductive non-magnetic conductor 14.

According to the above example, the flux barrier 12 is provided with a first penetrating portion and a second penetrating portion arranged in the radial direction for housing the magnet 13 and the conductive non-magnetic conductor 14, respectively. As a result, spaces on both sides of the magnet 13 in the circumferential direction are not blocked by the magnet 13, and when the spaces on both sides are filled with a conductor, the conductors injected into the spaces on both sides are electrically communicated through the conductor 14. For this reason, a motor including the rotor 20 can not only maintain a high start function but also have high efficiency.

In this example, the conductor 14 may be made of any material having the conductive and non-magnetic characteristic. For example, the conductor 14 may be formed of an aluminum material, a copper material, or the like, but this example is not limited to this.

In this example, the shape of the first penetrating portion 121 is an arbitrary shape when viewed along the axial direction. For example, the first penetrating portion 121 may be rectangular (e.g., shape shown in FIGS. 1 and 2), circular, elliptical, polygonal, or the like. Since the shape of the magnet 13 corresponds to the shape of the first penetrating portion 121, in a case where the first penetrating portion 121 has a rectangular shape, a corresponding rectangular magnet is used, and low cost can be achieved.

In FIG. 1, the conductor 14 housed in the second penetrating portion 122 may be a solid conductor inserted in the second penetrating portion 122. Note, however, that this example is not limited to this, and the conductor 14 housed in the second penetrating portion 122 may be formed by solidifying a liquid conductor injected into the second penetrating portion 122.

Figure 3:
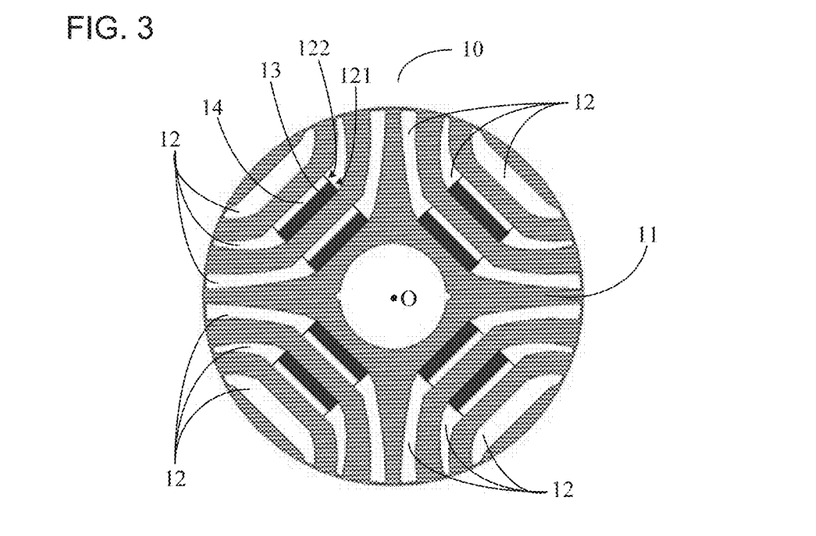
FIG. 3 is another schematic view of the rotor core according to Example 1 of the present invention as viewed from the axial direction.
Figure 4:
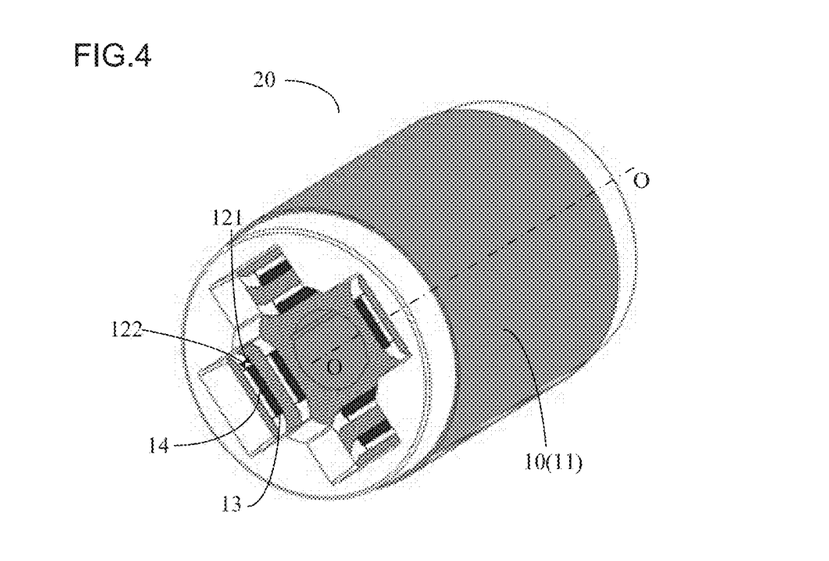
FIG. 4 is another perspective view of the rotor according to Example 1 of the present invention.

FIG. 3 is another schematic view of a rotor core according to the example of the present invention as viewed from the axial direction. FIG. 4 is another perspective view of the rotor according to the example of the present invention. As shown in FIGS. 3 and 4, no solid conductor is inserted in the second penetrating portion 122. The space of the second penetrating portion 122 and spaces on both sides of the first penetrating portion 121 and the second penetrating portion 122 in the circumferential direction in the flux barrier 12 are filled with a liquid conductor, and by curing and molding the injected liquid conductor, the conductor 14 housed in the second penetrating portion 122 is formed.

When injecting the liquid conductor into the second penetrating portion 122 in a case where the radial width of the second penetrating portion 122 is narrow, it is difficult to place the liquid conductor in the second penetrating portion 122. For this reason, in the case where the radial width of the second penetrating portion 122 is narrow, the solid conductor can be inserted so that the second penetrating portion 122 houses the solid conductor, whereby the difficulty of manufacturing the rotor can be reduced.

In this example, as shown in FIGS. 1 to 4, the radial width of the first penetrating portion 121 may be set larger than the radial width of the second penetrating portion 122. This can further improve the efficiency of the motor in which the rotor is located.

In this example, as shown in FIGS. 1 to 4, when viewed along the axial direction, the width of the first penetrating portion 121 in a direction perpendicular to the radial direction can be set smaller than the width of the second penetrating portion 122 in the direction perpendicular to the radial direction. In FIGS. 1 and 2, the width of the first penetrating portion 121 in the direction perpendicular to the radial direction is smaller than the width of the second penetrating portion 122 in the direction perpendicular to the radial direction, and in FIGS. 3 and 4, the width of the first penetrating portion 121 in the direction perpendicular to the radial direction is equal to the width of the second penetrating portion 122 in the direction perpendicular to the radial direction.

In this example, as shown in FIGS. 1 to 4, the first penetrating portion 121 may be provided so as to communicate with the second penetrating portion 122. With this configuration, the first and second penetrating portions can be used efficiently to improve the efficiency and starting capacity. Note, however, that this example is not limited to this, and a spacer member (not shown) may be provided between the first penetrating portion 121 and the second penetrating portion 122.

Figure 5A:
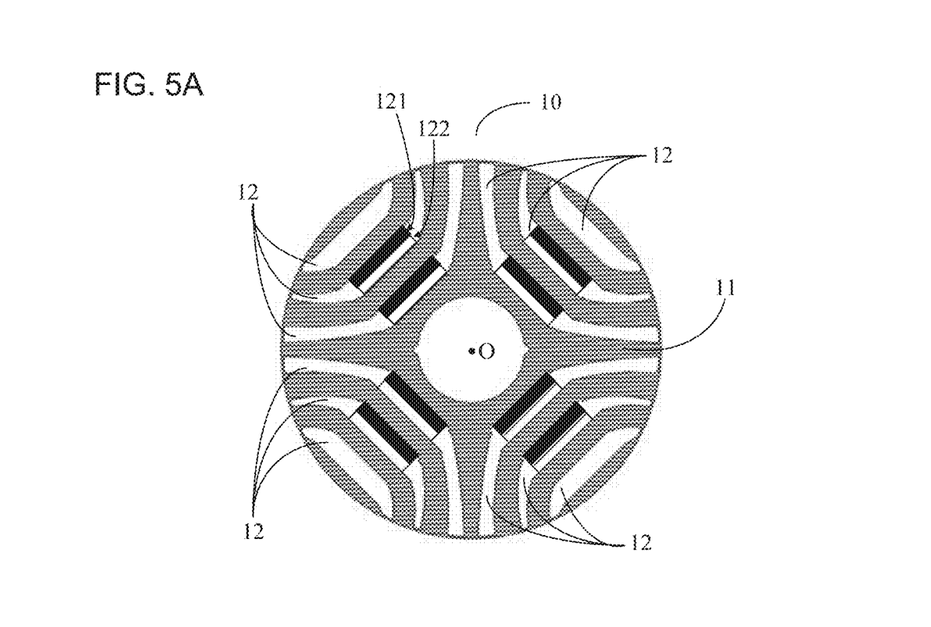
FIG. 5A is another schematic view of the rotor core according to Example 1 of the present invention as viewed from the axial direction.
Figure 5B:
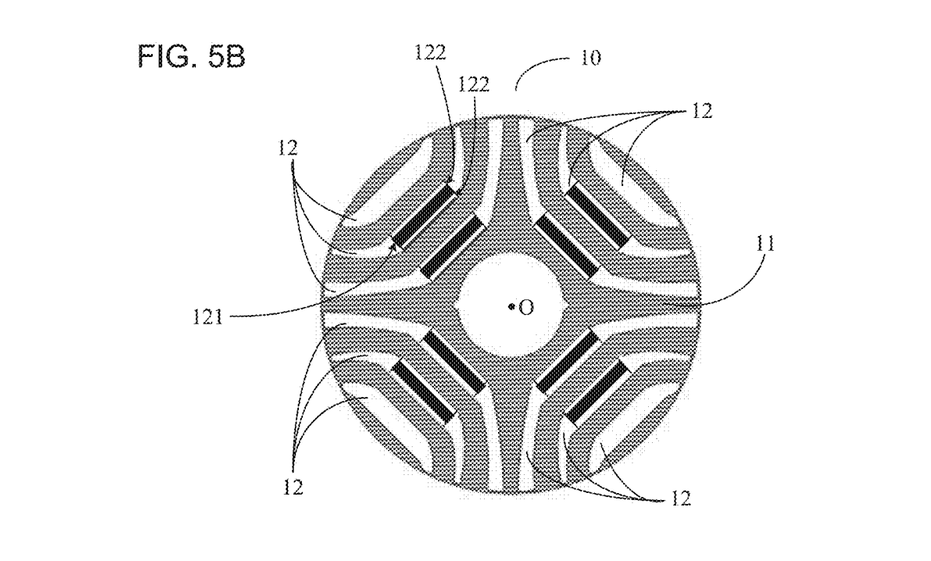
FIG. 5B is yet another schematic view of the rotor core according to Example 1 of the present invention as viewed from the axial direction.

In this example, as shown in FIGS. 1 to 4, the first penetrating portion 121 may be arranged radially inward in the flux barrier 12, and at this time, a single second penetrating portion 122 is located radially outward of the first penetrating portion 121. Note, however, that this example is not limited this, and as shown in FIG. 5A, the first penetrating portion 121 may be arranged radially outward in the flux barrier 12, and at this time, a single second penetrating portion 122 is located radially inward of the first penetrating portion 121. Alternatively, as shown in FIG. 5B, the first penetrating portion 121 may be arranged at the radially center position of the flux barrier 12, and at this time, each one of two second penetrating portions 122 is located radially inward and radially outward of the first penetrating portion 121.

In this example, multiple flux barriers 12 may form multiple flux barrier groups. The number of flux barrier groups is the same as the number of poles in the motor. For example, as shown in FIGS. 1, 3 and 5, multiple flux barriers 12 form four flux barrier groups, and each flux barrier group is formed of three flux barriers. The multiple flux barrier groups may be arranged at equal intervals in the circumferential direction so that the structure and performance of the motor become more uniform.

According to the rotor of this example, the flux barrier 12 is provided with a first penetrating portion and a second penetrating portion arranged in the radial direction for housing the magnet 13 and the conductive non-magnetic conductor 14, respectively. This allows the motor to not only maintain a high start function, but also achieve high efficiency.

Example 2 provides a synchronous reluctance motor including the rotor described in Example 1. According to the synchronous reluctance motor of this example, not only a high start function can be maintained, but also high efficiency can be achieved.

In this example, the motor may be applied to any electrical device. For example, the motor may be used as a motor of home appliances such as an indoor unit of an air conditioner, an outdoor unit of an air conditioner, a drinking fountain, a washing machine, a vacuum cleaner, a compressor, a blower, and a stirrer, a motor of industrial equipment such as a pump, a conveyor, an elevator, a standard industrial universal machine, a wind turbine, a grinder, and a traction motors, or a motor of various information processing equipment.

Example 3 provides a rotor forming method, and the rotor is the rotor described in Example 1.

Figure 6:
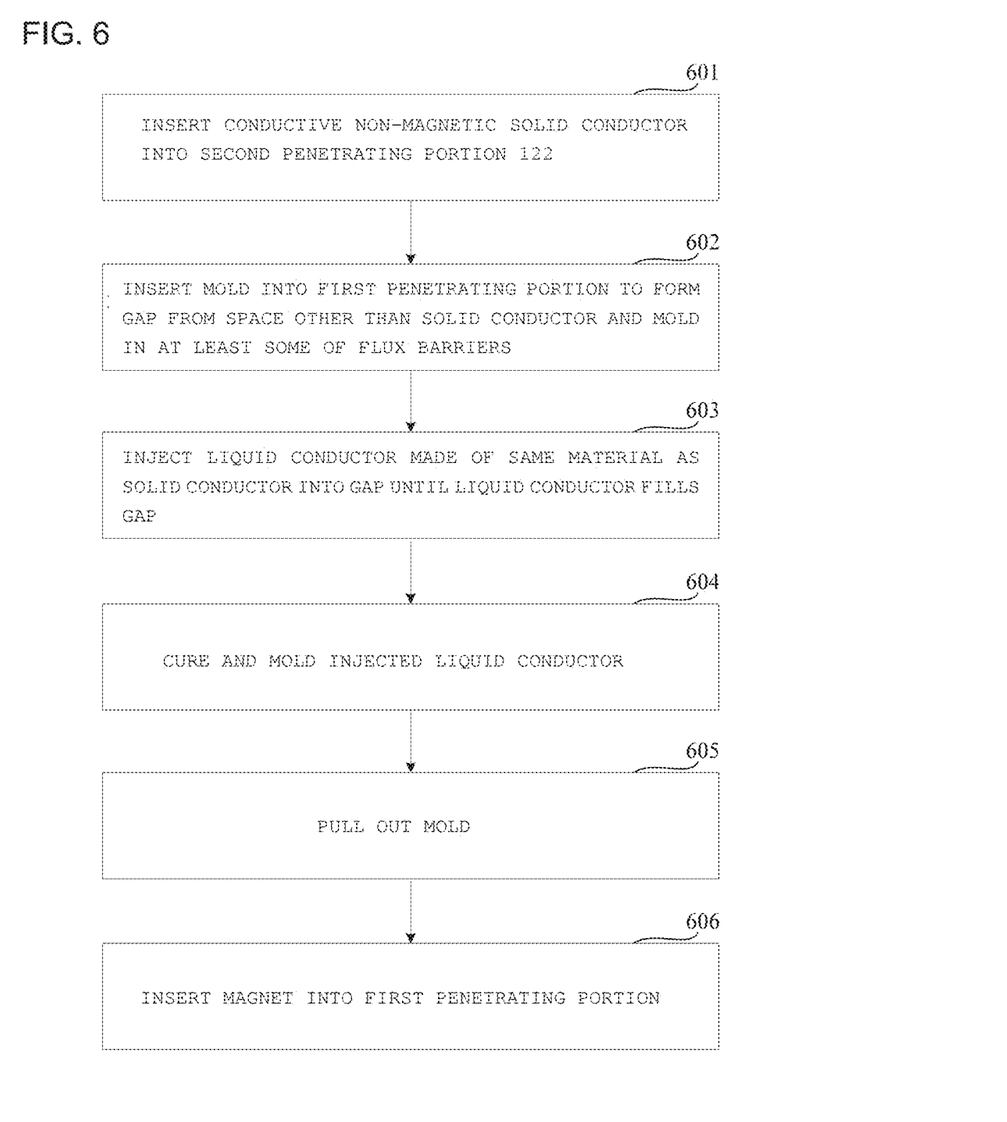
FIG. 6 is a schematic diagram of a rotor forming method according to Example 3 of the present invention.

FIG. 6 is a schematic diagram of the rotor forming method according to Example 3 of the present invention, and according to the method of FIG. 6, the rotor shown in FIGS. 1 and 2 can be formed. The method is carried out on the basis of a formed rotor core 10. The rotor core 10 is formed of electromagnetic steel sheets 11 rotating around a central axis O-O and laminated in the axial direction, and has multiple flux barriers 12 penetrating the electromagnetic steel sheets 11 along the axial direction. At least some of the multiple flux barriers 12 are provided with a first penetrating portion 121 and a second penetrating portion 122 arranged in the radial direction.

As shown in FIG. 6, the method includes:
step 601 of inserting a conductive non-magnetic solid conductor 14 into the second penetrating portion 122;
step 602 of inserting a mold into the first penetrating portion 121 to form a gap from a space other than the solid conductor 14 and the mold in at least some of the flux barriers 12;
step 603 of injecting a liquid conductor made of the same material as the solid conductor into the gap until the liquid conductor fills the gap;
step 604 of curing and molding the injected liquid conductor;
step 605 of pulling out the mold; and
step 606 of inserting a magnet 13 into the first penetrating portion 121.

As a result, the rotor shown in FIGS. 1 and 2 can be formed.

In the above method, a step of forming the rotor core 10 can be further included before step 601. In the step, the rotor core 10 can be formed by any known method. The step of forming the rotor core 10 is a selectable step, and the above steps 601 to 606 can be directly performed on the basis of the rotor core 10 machined and molded beforehand.

Figure 7A:
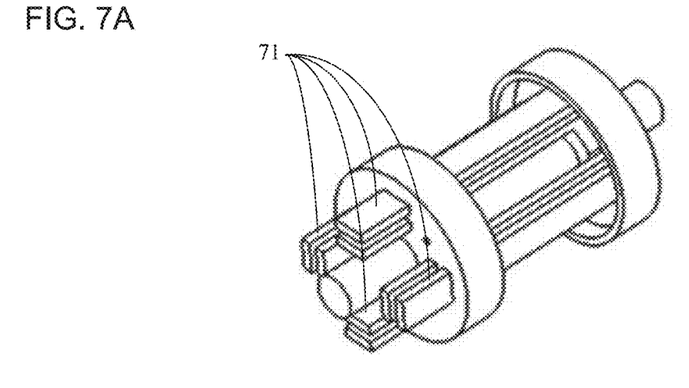
FIG. 7A is a front view of a mold used in Example 3 of the present invention.
Figure 7B:
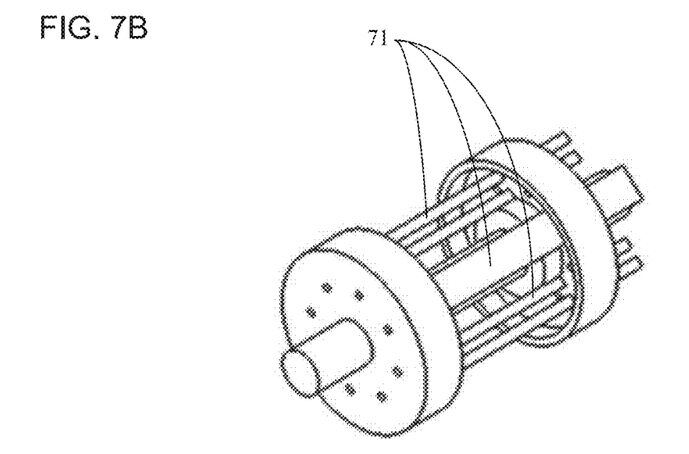
FIG. 7B is a rear view of the mold used in Example 3 of the present invention.
Figure 8A:
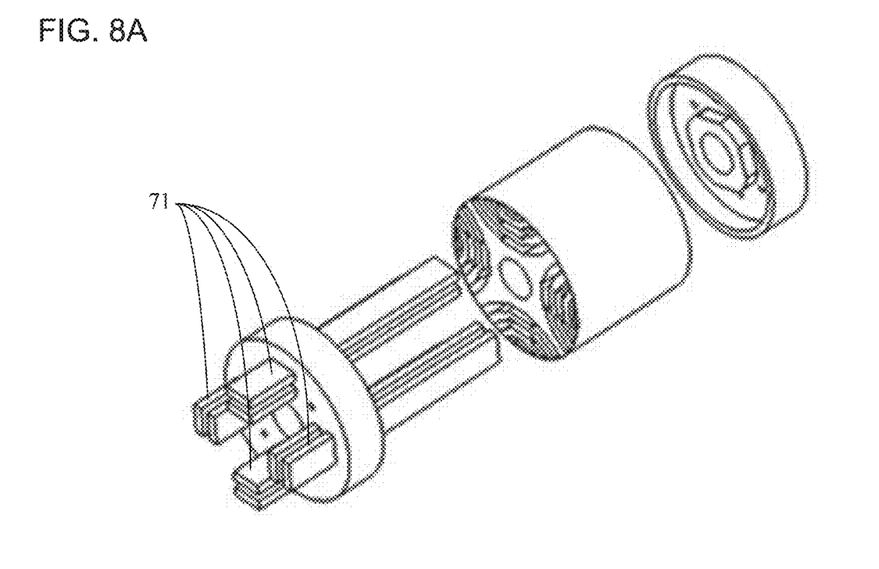
FIG. 8A is a schematic view of the mold and electromagnetic steel sheets used in Example 3 of the present invention before assembly.
Figure 8B:
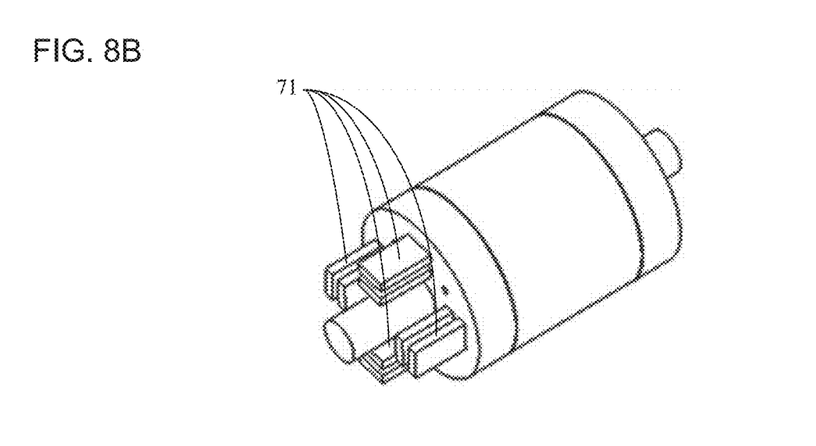
FIG. 8B is a schematic view of the mold and electromagnetic steel sheets used in Example 3 of the present invention after assembly.

FIGS. 7A to 8B show one example of the above-mentioned mold according to this example. FIGS. 7A and 7B are front and rear views of the mold, respectively, showing insertion portions 71 that need to be inserted into the first through holes 121, and the shape of the insertion portion 71 corresponds to the shape of the magnet 13. FIGS. 8A and 8B are schematic views before and after assembly of the mold and the laminated electromagnetic steel sheet, respectively.

In the above method, in a case of using the mold shown in FIGS. 7A to 8B, the mold is inserted into the first penetrating portion 121 in step 602, that is, the multiple insertion portions 71 in the mold are inserted into the multiple first penetrating portions 121, respectively. Note, however, that this example is not limited to the mold structure shown in FIGS. 7A to 8B, and any other suitable structure may be adopted as the mold used in the above method.

Figure 9:
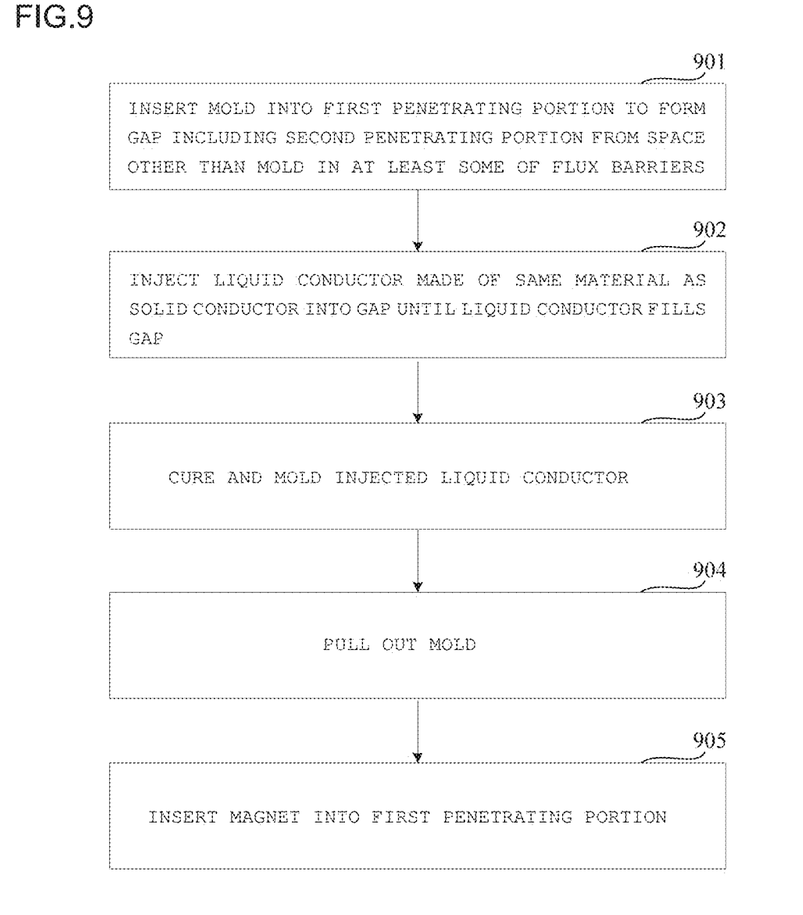
FIG. 9 is another schematic diagram of a rotor forming method according to Example 3 of the present invention.

FIG. 9 is another schematic diagram of a rotor forming method according to the example of the present invention, and according to the method of FIG. 9, the rotor shown in FIGS. 3 and 4 can be formed. The method was carried out on the basis of a formed rotor core 10. The rotor core 10 is formed of electromagnetic steel sheets 11 rotating around a central axis O-O and laminated in the axial direction, and has multiple flux barriers 12 penetrating the electromagnetic steel sheets 11 along the axial direction. At least some of the multiple flux barriers 12 are provided with a first penetrating portion 121 and a second penetrating portion 122 arranged in the radial direction.

As shown in FIG. 9, the method includes:
step 901 of inserting a mold into the first penetrating portion 121 to form a gap including the second penetrating portion 122 from a space other than the mold in at least some of the flux barriers 12;
step 902 of injecting a conductive non-magnetic liquid conductor into the gap until the liquid conductor fills the gap;
step 903 of curing and molding the injected liquid conductor;
step 904 of pulling out the mold; and
step 905 of inserting a magnet into the first penetrating portion 121.

As a result, the rotor shown in FIGS. 3 and 4 can be formed.

In the above method, a step of forming the rotor core 10 can be further included before step 901. In the step, the rotor core 10 can be formed by any known method. The step of forming the rotor core 10 is a selectable step, and the above steps 901 to 905 can be directly performed on the basis of the rotor core 10 machined and molded beforehand.

While the method shown in FIG. 9 can similarly use the mold shown in FIGS. 7A to 8B, the present invention is not limited to this, and any other suitable structure may be adopted as the mold used in the method.

The difference from FIG. 6 is that in the method of FIG. 9, no solid conductor is inserted into the second penetrating portion 121, and after the mold is inserted into the first penetrating portion 121, the liquid conductor is injected into the second penetrating portion 122 and the space other than the first and second penetrating portions 121 and 122 in the flux barrier. In other words, in FIG. 6, the conductor housed in the flux barrier is placed in the flux barrier two separate times: first, inserting the solid conductor into the second penetrating portion 122, and second, injecting the liquid conductor into the space other than the first and second penetrating portions 121 and 122 in the flux barrier. On the other hand, in FIG. 9, the conductor housed in the flux barrier is formed by injecting the liquid conductor into the space other than the first penetrating portion 121 in the flux barrier without dividing the injection into multiple times.

According to the method of this example, the flux barrier of the rotor is provided with a first penetrating portion and a second penetrating portion arranged in the radial direction for housing the magnet and the conductive non-magnetic conductor, respectively. This allows the motor to not only maintain a high start function, but also achieve high efficiency.

While the present invention has been described above by combining specific embodiments, those skilled in the art should understand that all of these descriptions are examples and do not limit the scope of protection of the present invention. Those skilled in the art can make various modifications and amendments to the present invention on the basis of the technical ideas and principles of the present invention, and these modifications and amendments are included within the scope of the present invention.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A rotor comprising:
a rotor core that is made of electromagnetic steel sheets rotating around a central axis and laminated in the axial direction, and that has a plurality of flux barriers penetrating the electromagnetic steel sheets along the axial direction, wherein
at least four of the plurality of flux barriers are provided with a first penetrating portion and a second penetrating portion arranged in the radial direction,
each of the at least four of the plurality of flux barriers further includes an additional flux barrier located radially outwardly to a corresponding flux barrier of the at least four of the plurality of flux barriers,
each of the first penetrating portions housing a magnet and each of the second penetrating portions housing a conductive non-magnetic conductor, respectively, wherein the magnet directly contacts the non-magnetic conductor and both the magnet and the non-magnetic conductor extend along a circumferential direction,
no magnets are present between circumferentially adjacent flux barriers of the at least four of the plurality of flux barriers; and
no magnet exists in the other flux barriers of the plurality of flux barriers.

2. The rotor according to claim 1, wherein
the conductive non-magnetic conductor is a solid conductor, and the solid conductor is inserted into the second penetrating portion to be housed in the second penetrating portion.

3. The rotor according to claim 1, wherein
the conductive non-magnetic conductor is a liquid conductor, and the liquid conductor is injected into the second penetrating portion to be housed in the second penetrating portion.

4. The rotor according to claim 1, wherein
a radial width of the first penetrating portion is larger than a radial width of the second penetrating portion.

5. The rotor according to claim 1, wherein
when viewed along the axial direction, a width of the first penetrating portion in a direction perpendicular to the radial direction is equal to or smaller than a width of the second penetrating portion in the direction perpendicular to the radial direction.

6. The rotor according to claim 1, wherein
the first penetrating portion communicates with the second penetrating portion.

7. The rotor according to claim 1, wherein
the plurality of flux barriers form a plurality of flux barrier groups, and the plurality of flux barrier groups are arranged at equal intervals in the circumferential direction.

8. The rotor according to claim 1, wherein
the first penetrating portion is arranged radially inward in the flux barrier and a single second penetrating portion is located radially outward of the first penetrating portion, or the first penetrating portion is arranged radially outward in the flux barrier and a single second penetrating portion is located radially inward of the first penetrating portion, or the first penetrating portion is arranged at a radially center position of the flux barrier and each one of two second penetrating portions is located radially inward and radially outward of the first penetrating portion.

9. The rotor according to claim 1, wherein
the first penetrating portion has a rectangular shape when viewed along the axial direction.

10. A synchronous reluctance motor comprising the rotor according to claim 1.

* * * * *